Patented Apr. 28, 1942

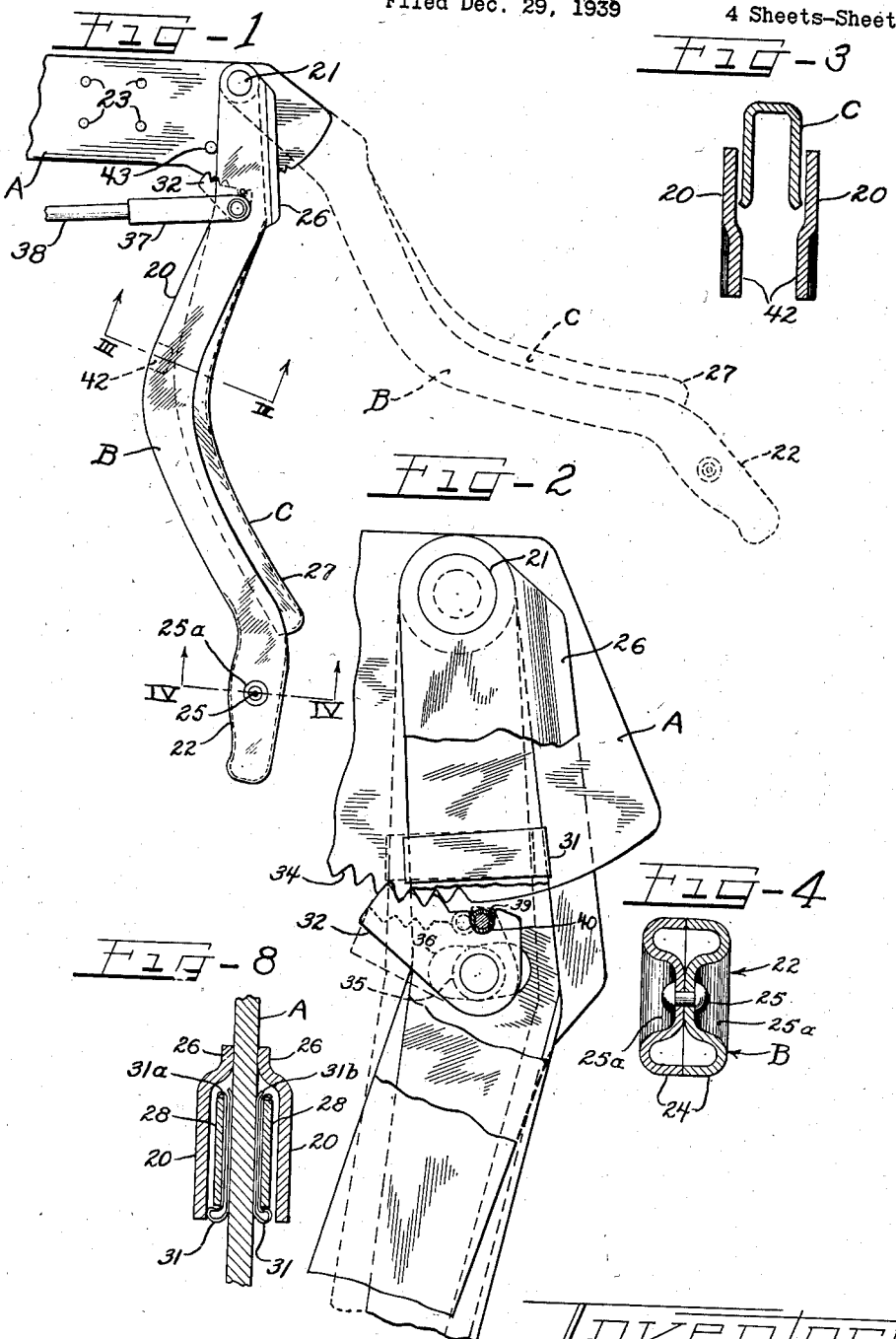
April 28, 1942.  H. S. JANDUS ET AL  2,281,155
NON-DRAG BRAKE LEVER
Filed Dec. 29, 1939  4 Sheets-Sheet 1
Inventors
Herbert S. Jandus
Hugh Buchanan

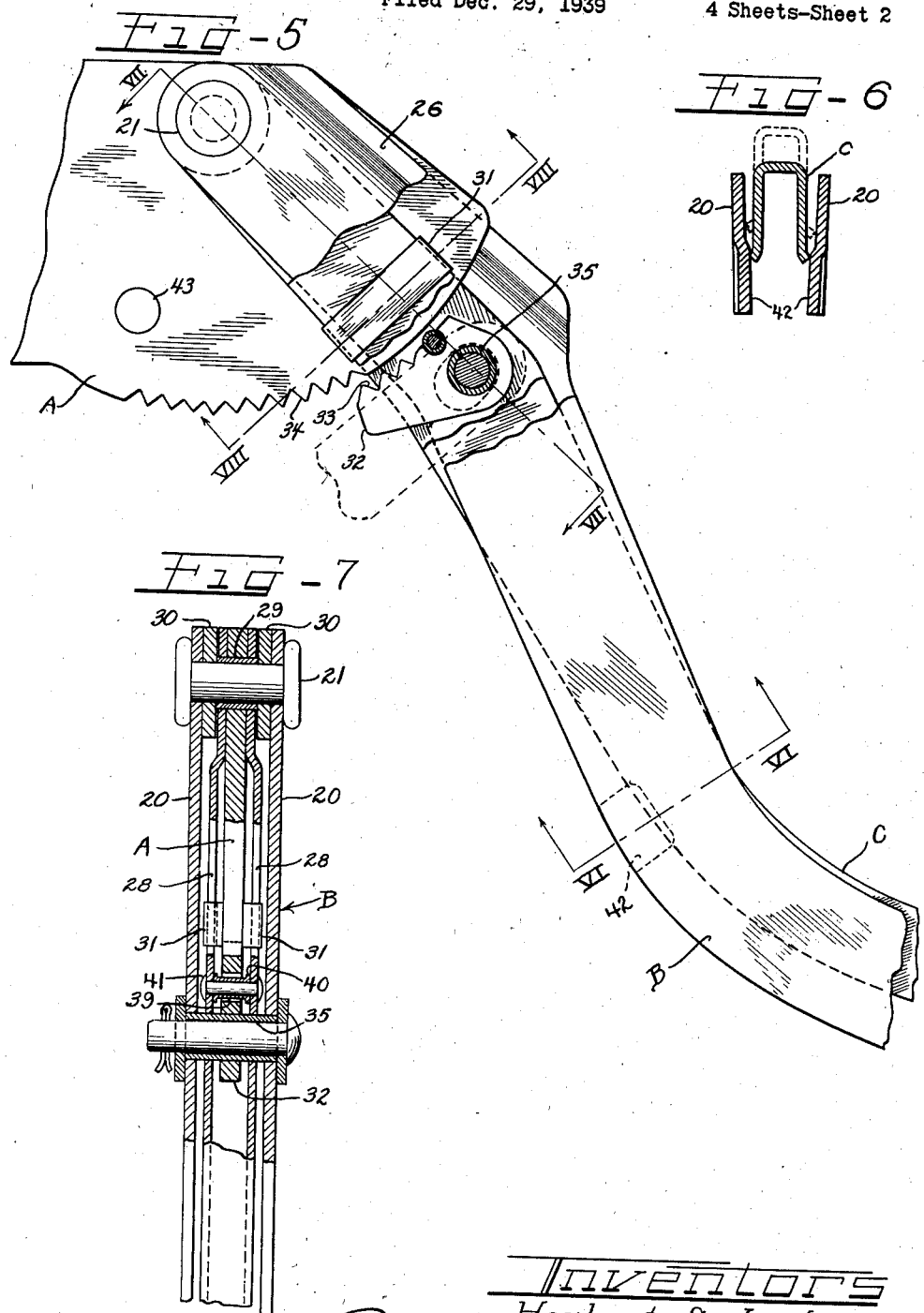

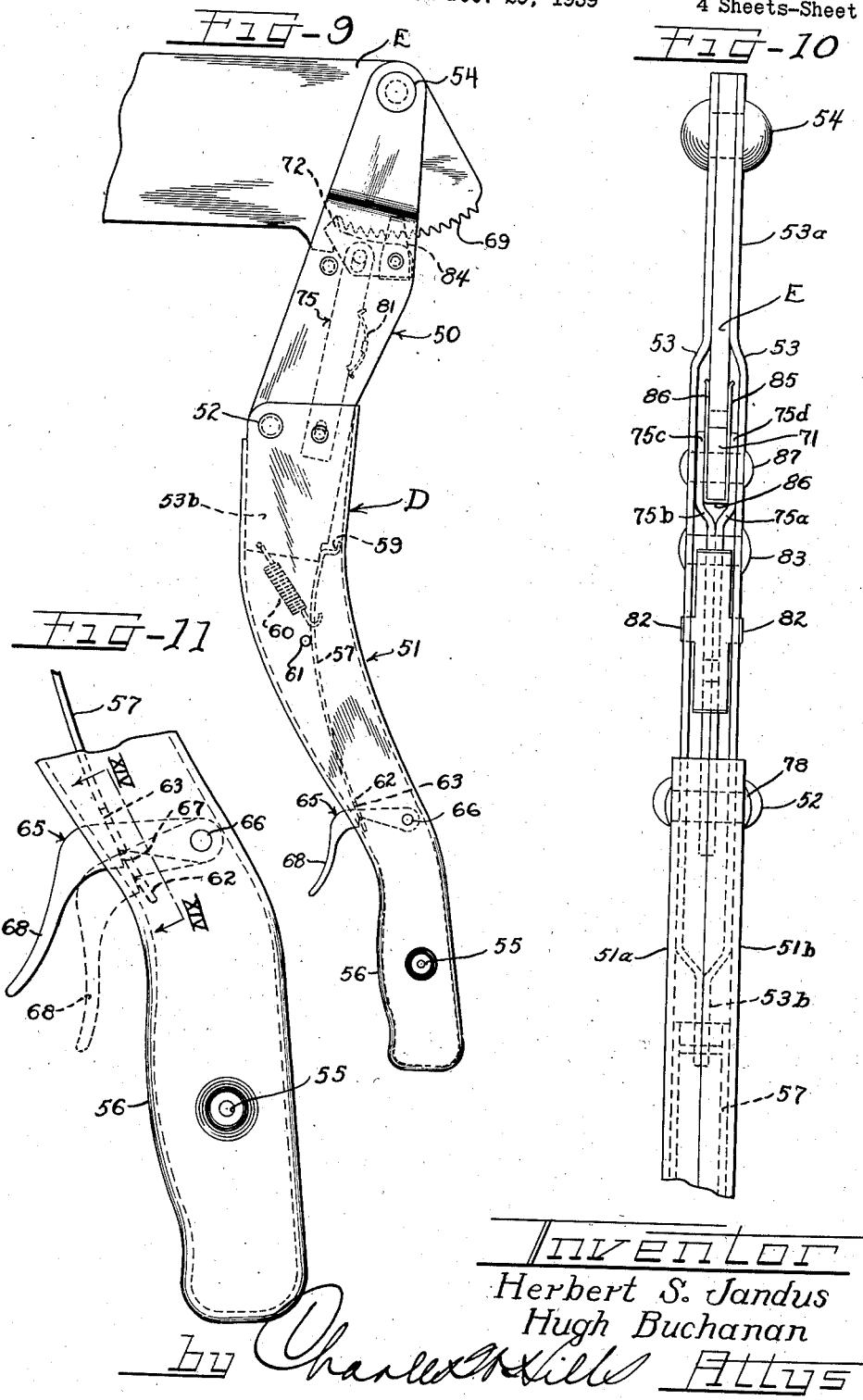

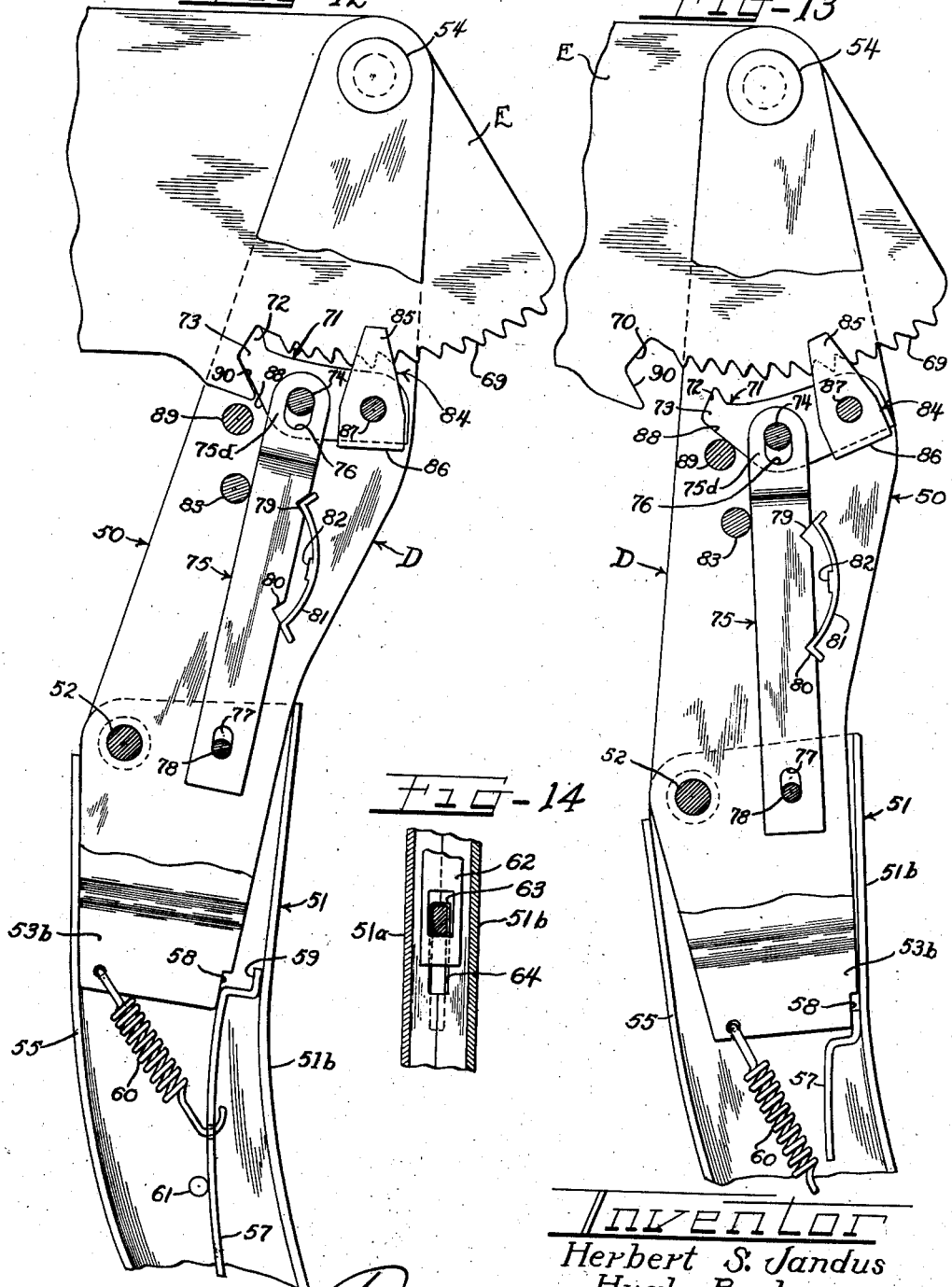

2,281,155

UNITED STATES PATENT OFFICE 2,281,155

NONDRAG BRAKE LEVER

Herbert S. Jandus and Hugh Buchanan, Detroit, Mich., assignors to Houdaille-Hershey Corporation, Detroit, Mich., a corporation of Michigan Application December 29, 1939, Serial No. 311,540

29 Claims. (Cl. 74—537)

The present invention relates to a brake lever, and more particularly to a novel brake lever of the pawl and ratchet type with the provision of means for automatically preventing clicking of the pawl over the ratchet as the lever is moved to brake setting positions and for engaging the pawl with the ratchet at the selected brake setting position rendering the brake lever holding action inoperative whenever the lever is moved to release the brakes.

The brake levers of this invention also include manually operable means for releasing the pawl at the selected brake setting position and means for automatically holding the pawl in released position until the lever reaches the end of its brake releasing path so that no drag can be placed on the brakes due to the operator's failure to move the lever sufficiently to free the brakes.

Many automobile drivers object to the clicking noise made by a pawl of an emergency brake lever when riding along the ratchet teeth as the lever is swung to a brake setting position. Although such levers are provided with release means for retracting the pawl to an inactive position, the usual practice of drivers is to grasp the grip or operating portion of the lever and pull in a brake setting direction, without actuating the release means.

Not only does this cause a clicking noise as the pawl rides along the ratchet teeth but usually results in undue wear and damage to the teeth of the pawl and sector.

Another objection frequently experienced is the prevalent practice of only partially releasing the brake lever when it is swung to a brake releasing position. Many drivers grasp the release means for rendering the pawl inoperative and rely on the brake rod tension to swing the lever to a brake releasing position. In most instances the pawl engages the ratchet before the lever reaches a full brake releasing position allowing the vehicle to be operated with the brakes partially set or dragging thereby resulting in needless brake wear.

It is therefore an object of the present invention to provide a brake lever wherein the clutching members are rendered inoperative whenever the lever is swung in a brake setting direction.

A further object of the present invention is the provision of a brake lever construction of the pawl and ratchet type in which the clicking noises caused by dragging the teeth of the pawl over the teeth of the sector are eliminated when the lever is moved to a brake setting direction.

A still further object of the present invention is to provide a pawl and ratchet type brake lever construction wherein a drag is imposed on the pawl release member of such character as to hold and rock the pawl out of the path of the ratchet teeth whenever the lever is swung in a direction to set the brakes.

Another and still further object of this invention is to provide a pawl and ratchet type brake lever construction wherein a drag is imposed on the pawl release member of such character to automatically hold and rock the pawl into latched or clutched engagement with the ratchet when hand pull is released from the lever and tension of the brake mechanism tends to move the lever in retrograde direction.

The invention has for a further object the provision of a pawl and ratchet type brake lever construction in which means other than the manually operated pawl release means automatically holds the pawl away from the ratchet teeth as the lever is swung in a direction to apply or set the brakes.

This invention has for another object the provision of friction means for moving the brake lever pawl out of the path of the ratchet teeth and to so hold the pawl during movement of the brake lever to brake setting positions.

A still further object of this invention is to provide a novel pawl and pawl release member construction whereby a drag is imposed on the pawl release member as the lever is moved in brake setting direction to maintain the pawl out of clicking engagement with its cooperating ratchet.

A further object of the present invention is to provide a brake lever with a stop to limit movement of the lever in a brake releasing direction.

Another and still further object of this invention is to provide a brake lever of the pawl and ratchet construction wherein the lever and release member are locked to maintain the pawl out of engagement with its cooperating ratchet and are only unlocked to thereafter allow cooperation between the pawl and ratchet by moving the lever to the end of its retrograde path.

The novel features believed to be characteristic of this invention are set forth with particularity in the appended claims. The invention itself, however, both as to its organization and manner of construction, together with further objects and advantages thereof, may best be understood by reference to the following description, taken in connection with the accompanying drawings, in which:

Figure 1 is a view in side elevation of one embodiment of a brake lever construction for automotive vehicles constructed in accordance with the principles of the present invention, showing, in full lines, the lever in "off" position or brake released position, and also showing the lever, in dotted lines, in "on" position or brake setting position.

Figure 2 is a fragmentary broken side elevational view illustrating in full lines the cooperation between the pawl and ratchet, and in dotted lines the retraction of the pawl from the ratchet as the lever is moved in a brake setting direction.

Figure 3 is an enlarged transverse sectional view taken substantially in the plane indicated by the line III—III of Figure 1, and illustrating the free nested relation between the release and lever members.

Figure 4 is an enlarged transverse sectional veiw taken substantially in the plane indicated by the line IV—IV of Figure 1, and illustrating the shape of the lever operating handle.

Figure 5 is a view similar to Figure 2, illustrating the relative position of the parts when the lever is moved to a brake setting position just prior to releasing the hand pull whereby the brake mechanism tension moves the pawl and ratchet into cooperation.

Figure 6 is a view similar to Figure 3, showing, in dotted lines, the free nested relation between the release member, and showing, in full lines, the frictional locking nested position between the release and lever members.

Figure 7 is a longitudinal edge cross-sectional view, with parts in elevation, taken substantially in the plane indicated by the line VII—VII of Figure 5.

Figure 8 is a transverse cross-sectional view taken substantially in the plane indicated by the line VIII—VIII of Figure 5, illustrating the frictional members carried by the pawl release member in surface engagement with the sector.

Figure 9 is a view in side elevation of another embodiment of the present invention illustrating the brake lever in "off" position.

Figure 10 is an enlarged fragmentary outer edge elevational view of the brake lever illustrated in Figure 9.

Figure 11 is an enlarged fragmentary side elevational view of the lever operating handle illustrating, in full lines, the position of the trigger member when the brake lever parts are locked together, and in dotted lines, when the lever parts are unlocked.

Figure 12 is an enlarged side elevational view similar to Figure 9, with parts broken away, illustrating more clearly the shape and relationship of the operating parts.

Figure 13 is a view similar to Figure 12 illustrating the relative position of the parts as the lever member is being pulled in a brake actuating direction.

Figure 14 is an enlarged fragmentary longitudinal cross section taken substantially in the plane indicated by the line XIV—XIV of Figure 11.

The drawings will now be explained.

The form of the invention shown in Figures 1 to 8 includes a mounting plate or bracket A of flat metal stamped to proper size and form. A lever member B is provided with spaced legs 20 for a major portion of its length, which legs straddle the plate A and are pivoted at their extremities to the plate by means of a suitable pivot pin 21. A tubular handle portion 22 is formed at the other end of the lever. The plate A is also provided with apertures or bolt holes 23 whereby it may be secured in place behind the instrument board of an automotive vehicle to support the brake lever B in dependent relation with its handle below the lower margin of the instrument board.

As best shown in Figures 1 and 4, the brake lever member B is formed from a pair of flat plates having their lower edges 24 turned inwardly and secured in abutting relation by means of a rivet or bolt 25 seated in dimples 25a formed in the plates to form a tubular handle. The flat plates extend upwardly in reverse curves to form the spaced legs 20 having at their upper ends inturned wing portions 26 in closely spaced relation from the sides of the bracket A.

A release member C, formed of flat metal and stamped to a U-shaped configuration in section for a major portion of its length, is provided at its lower end with an enclosed digitally operable portion 27 (Figure 1) and at its upper end with spaced legs 28 (Figures 7 and 8).

The uppermost portions of the spaced legs 28 are offset inwardly to closely straddle the bracket A and are pivotally connected thereto by means of a spacing sleeve 29. A pair of flat spacing washers 30 are inserted between the pairs of spaced legs 20 and 28. In this relation, the parts are pivotally connected to the bracket A by means of a suitable pivot pin 21, such as a rivet, bolt or the like, with the release member C positioned in nested relation with the lever member B and having its U-shaped section facing inwardly.

The outwardly offset portion of the spaced legs 28 of the release member C provides sufficient clearance between the legs and the bracket A for the insertion of flat friction members 31 having a hair-pin like section (Figure 8).

As best shown in Figures 2, 5, 7 and 8, the friction members 31 are provided with a pair of legs 31a and 31b. The legs 21a are bent at their ends to form hook portions which clamp around the edges of the legs 28. The flat legs 31b frictionally engage the side surfaces of the bracket A for a purpose to be hereinafter explained.

A flat pawl 32 is formed with teeth 33 for engaging ratchet teeth 34 formed on a margin of the plate A, the ratchet so formed and the pawl constituting clutching members for holding the lever member B in adjusted position.

The pawl 32 is pivoted to the spaced legs 20 of the lever member B by means of a hollow pivot or tubular member 35 passing through suitable elongated apertures in the sidewalls 28 of the release member.

A clevis 37 connects the brake operating rod 38 to the brake lever member B by means of the tubular pivot 35.

On its upper edge adjacent the teeth 33, the pawl is provided with a slot 39 which receives a tubular spacing sleeve member 40 positioned between the legs 28 and securely held therebetween by means of a rivet 41 secured to the legs. When the release member C is actuated relative to the brake lever member B, the pivot pin 41 is rocked in a transverse direction to actuate the pawl either into or out of cooperating clutching engagement with the ratchet teeth 34.

As illustrated, in Figures 1, 3, 5, and 6, depressed portions 42 are provided at the edges of the spaced legs 20 at a point intermediate their ends. In their normal operative positions, the spaced legs 20 of the lever member B and the U-shaped portion of the release member C are positioned as shown in Figure 3. When the release member is moved inwardly the sidewalls thereof frictionally engage the depressed portions 42 to provide a frictional lock between the two members. As clearly shown in Figure 5, when the parts are in this position the pawl is rocked out of cooperating engagement with the sector teeth. The brake lever assembly is then capable of being swung to either of its swinging limits without any engagement between the pawl and sector. It is to be noted that the frictional lock engagement between the release member C and the lever member B is greater than the drag imposed upon the release member by the frictional engagement between the flat friction members 31 and the side surfaces of the plate A.

When the release and lever members are in locked engagement, the upper forward edges of the spaced legs 28 project beyond the adjacent edges of the spaced legs 20.

A stop pin 43 is provided in the plate A adjacent the ratchet portion and extends laterally on both sides of the plate to a distance approximately the width of the spaced legs 28. This stop pin defines the swinging limit of the lever member in a brake releasing direction.

With the release and lever members in locked engagement, tension of the brake mechanism is sufficient to move the lever in a brake releasing direction against the stop pin 43 and the abutment between the stop pin and the extending edges of the spaced legs 28 disengages the frictional engagement between the said members.

When the driver of the vehicle grasps the handle of the brake lever and pulls it in a brake setting direction, the frictional engagement between the members 31 and the side surfaces of the plate A imposes a drag on the release member C which is sufficient to rock and maintain the pawl out of engagement with the ratchet during the swinging of both the release and lever members to an adjusted position. The lever member is operable in a brake setting direction without the accompaniment of the clicking engagement between the pawl and ratchet experienced in the usual brake lever.

When the vehicle driver releases his grip on the lever member tension of the brake mechanism tends to move the lever in a counterdirection. The flat members 31 again impose a frictional drag on the release member sufficiently to rock the pawl into tooth engagement with the ratchet thereby positively holding the lever member in its adjusted position. As mentioned previously, by exerting thumb pressure against the release member C a frictional locking engagement is effected with the lever member B thereby disengaging the clutching cooperation between the pawl and sector to allow the brake mechanism tension to pull the lever assembly against the stop pin 43 in a fully brake released position.

Another embodiment of the brake lever construction is illustrated in Figures 9 to 14 inclusive. The form of lever herein illustrated includes a two-part jointed lever member generally designated by the reference character D comprising an upper lever part 50 and a lower lever part 51 pivotally connected together adjacent an edge thereof by a suitable pivot pin 52, such as a rivet, bolt or other suitable means.

The upper lever part 50 consists of a pair of spaced legs 53 the upper portions of which are offset inwardly as at 53a and pivotally connected at their ends to a support E by means of a pivot pin 54, such as a rivet or bolt. At their lower ends, the spaced legs 53 are provided with portions 53b turned inwardly into face engagement.

The lower lever part 51 is of tubular section formed from flat metal into U-shaped halves 51a and 51b and which are connected by a bolt or rivet 55. The lower portion of the lever part 51 is formed with a closed grip 56, of suitable shape and formation. The upper end of the lever part is slightly flared and pivotally receives the lower portion of the upper brake lever part 50.

It is to be noted that the lower portions 53b of the upper brake lever part 50 are slightly tapered so that the lower brake lever part may be rocked from the edge engagement between the edges of the spaced legs 53 and the webs of the lower lever part 51.

The brake lever parts are locked together by means of a flat spring link 57. One end of the link engages a notch 58 which is provided on an edge of the engaged portions 53b. An offset portion 59 of the link engages a web of the lower lever part 51 to thereby effect an edge engagement between the opposite web of the lower lever part and the adjacent edges of the legs 50, as may be observed in Figure 12. This wedging engagement between the upper end of the link 57 and the brake lever parts is normally maintained by a coil spring 60 having one end hooked into the link 57 and its other end hooked in the corner of the plate portions 53b opposite the notched corner 58.

A pin 61 is inserted through the sidewalls of the lower lever part against which the link 57 abuts for limiting lateral movement thereof under the influence of the coil spring 60.

The link 57 extends downwardly to a point adjacent the handle or grip 56, with its lower end 62 engaging against the web of the lower lever part opposite the web engaging the offset portion 59. As may be observed in Figures 11 and 14, a slot 63 is provided in the end 62 of the link 57. An elongated slot 64 is also provided in the lever part web adjacent the slotted end 62.

A trigger 65 extends through both slots and is pivotally connected within the lower lever part by means of a pin 66. A notch 67 is provided in the trigger for engaging the slotted portion of the link 57. The trigger 65 is also provided with a finger operable portion 68, which normally projects outwardly beyond the slotted web in an actuating position.

As shown in full and dotted lines in Figure 11, the link 57 is endwise movable by rocking the trigger 65 around its pivot 66. As will be observed in Figures 11, 12 and 13, by rocking the trigger the lever parts are unlocked allowing tension of the spring 60 to urge the upper end of the link 57 against the lower edge of the plates 53 rather than between the plates and the adjacent lever part web. With the parts in an unlocked position, the brake lever part 51 may be pivotally rocked about its pivot pin 52 in the angle defined by the tapered portions of the lever parts, as shown in Figures 12 and 13. To lock the brake lever parts, the operator grasps the brake lever handle and swings the lower lever part 51 about its pivot 52 in a brake actuating direction. The tension of the spring 60 then urges the upper portion of the link 57 into the wedging engagement as illustrated in Figure 12.

The support E is fashioned from a plate of flat steel stock of suitable thickness and is provided with an arcuate margin in which are cut ratchet teeth 69, constituting the ratchet for one of the clutch members of the lever construction. At one end of the ratchet there is provided a coarse tooth or stop 70 for a purpose to be explained fully hereinafter.

A pawl 71, having at least one ratchet engaging tooth 72, is provided with a portion shaped to complementally engage within the coarse tooth 70. The pawl is pivotally connected to the spaced legs 53 by means of a pivot pin 74.

A link 75, consisting of a pair of plates 75a and 75b in face engagement for a major portion of their length and having offset portions 75c and 75d provided with elongated apertures 76 which straddle the pawl, is pivotally supported by the pivot pin 74. The lower ends of the plates comprising the link 75 are provided with registered elongated apertures 77 for receiving a pivot pin 78 which extends through the spaced plates 53 and the sidewalls of the lower lever part 51. It is to be noted that pivot pins 74 and 78 are so positioned as to normally bear at the outer ends of the elongated slots through which they extend.

Intermediate its ends, the link 75 is provided with longitudinally spaced V-shaped notches 79 and 80.

A leaf spring 81, curved in a longitudinal direction, is provided with a pair of laterally extending ears 82 which hook through apertures in the spaced plates 53. The ends of the spring are bent angularly outwardly to register with each of the V-shaped notches 79 and 80. The pressure of this spring against the link is resisted by a pin 83, whose sole purpose is to relieve the pawl of any frictional resistance which might otherwise impede its action.

A spring clip 84 is formed U-shape, in edge view, with its legs 85 engaging against the side surfaces of the pawl and its closed portion 86 against the straight under side margin of the pawl. The ends of the legs extend beyond the ratchet engaging tooth portion 72 of the pawl and engage opposite surfaces of the support E, inwardly of the ratchet teeth 69, with pinching action, as will be observed in Figure 10. The U-shaped clip is connected to the pawl by means of a pin 87 which extends laterally from both sides thereof through apertures provided in the spaced legs 53 to constitute a pivotal connection therewith.

The pawl 71 is provided on its underside with a sloping edge 88, constituting a foot which is so positioned as to rest against a pin 89 as a stop when the pawl is rocked out of latching engagement with its ratchet, as illustrated in Figure 13, and slidingly engages the sloping edge 90 of the stop 70 to thrust the pawl toward the sector into an active position when the lever is moved to a position as illustrated in Figure 12.

The relationship of the parts shown in Figure 12 occurs when the lever is in "off" position. To move the lever to set the brakes, the lever is swung in counter-clockwise direction by a pull on the grip 56.

Because of the pinching or frictional engagement of the clip 84 with the side surfaces of the ratchet or support member E, when the lever is swung, as stated, the pawl will be moved out of latched engagement with the ratchet and seated against the pin 89 in which position the pawl remains throughout angular travel of the lever in counter-clockwise direction.

When the brake is moved to its adjusted position, a retroactive movement of the lever exerted by tension of the brake mechanism allows the pinching or frictional engagement of the clip with the surfaces of the ratchet or support member to swing the pawl into engagement with the teeth of the sector thus holding the lever in its adjusted position. It is to be noted that the frictional engagement of the clip 84 with the side surfaces of the ratchet sector imposes a drag on the pawl to rock it about the pivot 74. The elongated aperture 76 allows the pivot pin 74 to oscillate vertically as the pawl is being rocked into and out of engagement with the sector by means of the frictional engagement between the clip and support.

To release the pawl, the trigger 65 is pulled towards the handle to operate the link 57 in an endwise direction. This movement withdraws the offset portion 59 from its abutting engagement between the notch 58 and the web of the lever part 51. With the parts in this position, a forward thrust on the handle 56 rocks the lower lever part 51 around its pivot 52. By rocking the lower lever part in a clockwise direction, the pawl is withdrawn from toothed engagement with the sector through the link 75 and at the same time the upper free end of the curved spring 81 is rocked out of engagement with the V-shaped notch 79 and into engagement with the V-shaped notch 80. Compression of the spring 81 holds the clutching members out of engagement so that the brake lever may be released from the hand entirely.

Tension of the brake mechanism is sufficient to move the brake lever into "off" position where engagement between the sloping edges of the pawl and sector stop coacts to thrust the pawl upwardly into an active position. In this latter position, engagement between the lower end of the spring 81 and the V-shaped notch 80 is broken and the upper end of the spring engages with the V-shaped notch 79 to hold the pawl in an active position.

It is to be noted that the brakes must be completely released before the brake lever parts can be actuated in a brake setting direction.

The shapes of the ratchet teeth 69 and the cooperating tooth 72 of the pawl 71 are conventional. It is to be understood that any tooth contour may be used which will function in carrying out the features of the present invention.

The invention has been described herein more or less precisely as to details, yet it is to be understood that the invention is not limited thereby, as changes may be made in the arrangement and proportion of parts, and equivalents may be substituted, without departing from the spirit and scope of the invention.

We claim as our invention:

1. A lever construction comprising a lever arranged for pivotal connection to a support, cooperating clutching members for holding said lever in adjusted position, means frictionally engageable for rendering said clutching members inoperative and being arranged of their own accord when so engaged for maintaining the clutching members out of cooperation to allow said lever to be freely and fully swung in either direction, additional means for automatically rendering said clutching members operative when said lever is swung to one of its limits, and other means operative when said first means are inoperative for maintaining said clutching members out of cooperation when the lever is moved in one direction and for maintaining said members in cooperation when the lever is moved in the opposite direction.

2. A lever construction comprising a lever pivotally connected to a support to be swung between predetermined limits, cooperating clutching members for holding said lever in adjusted position, a clutch-actuating member, means for holding said clutch-actuating member and said lever together as a unitary member to hold said clutching members out of cooperation whereby said unitary member is free to be fully swung in either direction between said limits, and a stop for limiting the movement of said unitary member in one direction and for releasing said clutch actuating member and said lever for relative movement.

3. A lever construction comprising a lever arranged for pivotal connection to a support to be swung between release and actuating positions, cooperating clutching members for holding said lever in adjusted position, means for holding one of said clutching members in a position out of cooperation with the other clutching member and permitting the lever to be fully swung in either direction between said release and actuating positions, and means on the support operatively engaging said first means when said lever is swung to its release position for releasing said one clutching member for cooperation with the other clutching member.

4. A lever construction comprising a lever pivotally connected to a support to swing between predetermined limits, cooperating clutching members for holding said lever in adjusted position, an automatic clutch-operating mechanism operative by swinging movement of said lever for rocking and holding said one of the clutching members out of cooperation with the other of said clutching members during movement of the lever in one direction and rocking said one clutching member into cooperation with said other clutching member upon movement of the lever in the opposite direction, a second clutch-operating mechanism effective by manual operation to lock said clutching members out of cooperation and permit free swinging movement of the lever in either direction between said limits, and means for actuating said second clutch-operating mechanism to unlock said clutching members and for cocking said first-mentioned clutch-operating mechanism into operative position only when the lever is moved to one of its swinging limits.

5. A lever construction comprising a support, a lever swingably mounted thereon, cooperating clutching members to hold the lever in adjusted position, means operatively connecting said clutching members for holding them in released relation during movement of the lever in one direction and effecting engagement therebetween upon movement of the lever in the opposite direction, manually operated clutch-actuating mechanism arranged for locking one of said clutching members out of cooperation with the other of said clutching members and for rendering said first means inoperative, said one clutching member when locked out of said cooperation permitting the lever to freely swing in both directions, and means for unlocking said one clutching member and rendering said first means operative.

6. A brake lever construction comprising a support having a portion formed as a clutching member, a lever member having spaced legs for pivotal connection to said support, a second clutching member cooperating with said first clutching member for holding said lever in adjusted position, manually operable means carried by said lever member for unclutching said cooperating clutching members and being arranged of its own accord for maintaining said unclutched relation, and additional means frictionally engaging one of said clutching members and operatively associated with the other of said clutching members for holding them out of cooperation when the brake lever is operated in one direction and for maintaining said members in clutching cooperation when the lever is operated towards the opposite direction.

7. A brake lever construction comprising a support having a clutching surface thereon, a lever pivotally connected to said support, a clutching member cooperating with said clutching surface for holding said lever in adjusted position, means connected to said clutching member and operable for unclutching it, said means being arranged of its own accord for maintaining said clutching member out of cooperation with said clutching surface and additional means engaging said support and being operable for holding the clutching member out of holding cooperation when said lever is swung on its pivot in one direction and for moving the clutching member into said clutching cooperation when swung in the opposite direction.

8. A brake lever construction comprising a lever having a handle at one end and spaced legs at the other end for pivotal connection to a support, cooperating clutching members for holding said lever in adjusted position, a clutch release member having one end pivotally connected to one of said clutching members and its other end adapted to be moved for unclutching said cooperating members, said clutch release member being arranged of its own accord for maintaining said clutching members out of cooperation and spring members engaging the side surfaces of the other of said cooperating members to impose a drag on said one clutching member for holding both members out of cooperation when said lever is swung in one direction and for moving said members into cooperation when swung toward the opposite direction.

9. A brake lever construction comprising a support having a clutching surface on an edge thereof, a lever straddling and being pivotally connected to said support, a pawl pivotally connected to said lever and cooperating with the clutching surface on said support for holding said lever in adjusted position, an endwise movable release member for rocking said pawl out of cooperation with the clutching surface, a lost-motion connection between said release member and said pawl, and means operatively connecting said pawl and support for maintaining said pawl in said clutching cooperation when the lever is moved in one direction and for maintaining said pawl out of said clutching cooperation when moved in the opposite direction.

10. A brake lever construction comprising a support, a ratchet sector on said support, a lever having a handle at one end and spaced legs at its other end for pivotal connection to said support, a pawl pivotally carried by said lever and adapted to be rocked into and out of engagement with said sector, said pawl and sector cooperating to hold said lever in adjusted position, a release member having a portion adjacent one end connected to said pawl and operable at its other end to rock said pawl into and out of engagement with said sector, a spring member engaging the side surfaces of said sector for imposing a drag on the pawl to rock the latter out of clutching engagement with the sector when said lever is operated in a brake setting direction and to rock the pawl into clutching engagement when said lever is operated in a brake releasing direction, and means carried by said support for urging said pawl in clutching engagement when said lever is moved to a fully brake releasing position.

11. A brake lever construction comprising a lever having spaced legs for pivotal connection to a support, cooperating clutching members for holding said lever in adjusted position, a clutch release member coaxially pivoted in nested relation with said lever and operable for unclutching said clutching members, means carried by the clutch release member for frictionally connecting said clutch release member to the support for normally maintaining said clutching members in cooperation when said lever is urged in one direction and for maintaining said members out of cooperation when operated in the opposite direction.

12. A brake lever construction comprising a lever having a handle at one end and spaced legs for a major portion of its length pivotally connected to a support, a ratchet sector on said support, a release member of U-shaped configuration for a major portion of its length having a digitally operable portion at one end and spaced legs at its other end, said release member being coaxially pivoted with said lever and operable between said lever legs within predetermined swinging limits, a pawl having separate pivotal connections to the legs of said lever and release member, and flat members carried by said release member engaging the side surfaces of said sector for imposing a drag on the swinging movements of said release member for rocking said pawl out of engagement with said sector when said lever is moved in a brake setting direction and for rocking said pawl into engagement with said sector when the lever is moved in the opposite direction, said pawl and sector being locked out of engagement by moving said release member to one of its swinging limits.

13. A brake lever construction comprising a lever having a handle at one end and spaced legs for a major portion of its length pivotally connected to a support, a ratchet sector on said support, a release member of U-shaped configuration for a major portion of its length having a digitally operable portion at one end and spaced legs at its other end, said release member being coaxially pivoted with said lever and operable between said lever legs within predetermined swinging limits, a pawl positioned between the sidewalls of said release member and pivotally connected to the legs of said lever, said release member having slots in its sidewalls through which extend the pivotal connection of said pawl and lever, said slots defining the predetermined limits of movement of said release member relative to said lever, a pin connecting the sidewalls of said release member and engaging a slot in said pawl, said pin and pawl pivotal connections cooperating to rock said pawl into and out of engagement with said ratchet when the release member is moved between said swinging limits, and flat members carried by said release member and engaging the sides of said ratchet for imposing a drag on the release member when said brake lever is operated, said drag effecting a release between said pawl and ratchet when said lever is moved in a brake setting direction and a clutching engagement therebetween when the lever is moved in the opposite direction, a locking release between said pawl and ratchet being effected when the lever is moved in the latter direction by operation of said release member.

14. A brake lever construction comprising a lever having a handle at one end and spaced legs for a major portion of its length pivotally connected to a support, a ratchet sector on said support, a release member of U-shaped configuration for a major portion of its length having a digitally operable portion at one end and spaced legs at its other end, said release member being coaxially pivoted with said lever and operable between said lever legs within predetermined swinging limits, a pawl positioned between the sidewalls of said release member and pivotally connected to the legs of said lever, said release member having slots in its sidewalls through which extend the pivotal connection of said pawl and lever, said slots defining the predetermined limits of movement of said release member relative to said lever, a pin connecting the sidewalls of said release member and engaging a slot in said pawl, said pin and pawl pivotal connections cooperating to rock said pawl into and out of engagement with said ratchet when the release member is moved between said swinging limits, members carried by said release member and engaging the sides of said ratchet for imposing a drag on the release member when said brake lever is operated, said drag effecting a release between said pawl and ratchet when said lever is moved in a brake setting direction and a clutching engagement therebetween when the lever is moved in the opposite direction, a locking release between said pawl and ratchet being effected when the lever is moved in the latter direction by operation of said release member, and an abutment carried by said support for effecting an unlocking of said last release when the lever is swung to a brake releasing position.

15. A brake lever construction comprising a support, a ratchet sector on said support, a pawl beneath said sector, a release member of U-shaped configuration for a major portion of its length having sidewalls forming a digitally operable portion at one end and spaced legs at the other end straddling said support, a pair of flat spring members carried by said release member and adapted to frictionally engage the side surfaces of said sector for imposing a drag when said release member is moved on its pivot, a lever having an operating handle at one end and spaced legs straddling said release member, said lever and release member being coaxially pivoted to said support, the legs of said lever having inwardly depressed portions intermediate its ends for engaging said release member with locking action, an abutment on said support for effecting a disengagement of the locked engagement between the release member and lever, said pawl being positioned between the legs of said release member and pivotally connected therethrough to the legs of said lever, the legs of said release member having slots through which extend said last pivotal connection to define the limits of movement of said member relative to said lever, said pawl also having a pivotal connection to the sidewalls of said release member.

16. A brake lever construction comprising a support having a portion formed to provide a clutching surface, a digitally operable release member having spaced legs straddling said support, a lever member having spaced legs stradling said release member, the spaced legs of said lever and release members having a common pivotal connection to said support, a clutching member having independent pivotal connections to said lever and release members and adapted to be operated into and out of engagement with said clutching surface, means for holding said release member and said lever member together against relative movement for maintaining disengagement between said clutching member and surface, additional means for releasing said members for relative movement, and frictional means between said support and release member to effect a disengagement between the clutching member and surface when the lever member is moved in one direction and to effect an engagement therebetween when the lever member is moved in the opposite direction.

17. A brake lever construction comprising a lever member and a release member having a common pivotal connection to a support and arranged for jack-knife action, a clutching member adapted to cooperate with a clutching surface and having separate pivotal connections to said lever and release members, means for holding said last members together for freely swinging them as a unitary lever in either direction, and additional means for releasing said last members from unitary engagement for effecting a clutching cooperation when said members are moved in but one direction.

18. A brake lever construction comprising a two-part jointed lever member, one of said lever parts having spaced legs for pivotal connection to a support, the other of said lever parts being pivotally connected to said one part, means for locking said lever parts to effect a unitary lever, a clutching member pivotally connected to said one lever part and arranged for cooperation with said support to hold said lever member in adjusted position, spring urged means connecting said clutching member and said other lever part for breaking said clutching cooperation when said lever parts are unlocked, and additional means engaging said clutching member and support for effecting the making and breaking of said clutching cooperation when said unitary lever member is moved.

19. A brake lever construction comprising a support, a toothed ratchet sector on said support, a lever member having spaced legs straddling said support and being pivotally connected thereto, a toothed pawl carried by said lever member and arranged to be rocked into and out of tooth engagement with said sector, means for rocking and being arranged of its own accord for holding said pawl out of said clutching engagement, stop means on said sector for limiting movement of said lever in a releasing direction and for automatically rendering said pawl operative for clutching engagement with said sector, and frictional means engaging the side surfaces of said sector for automatically effecting clutching engagement between said pawl and said sector when the lever member is moved in one direction and for breaking said clutching engagement when the lever member is moved in the opposite direction.

20. A brake lever construction comprising a support, a ratchet sector on said support, a two-part jointed lever member, one of said lever parts including spaced legs straddling said support and being pivotally connected at one end thereto, a pawl carried between said spaced legs and arranged to be rocked into and out of engagement with said sector, the other of said lever parts being tubular and having one end shaped to provide a handle and the other end pivotally receiving a portion of said one part, an endwise movable locking plate having one end arranged to slide between an edge of said one lever part and a wall of said other lever part to lock said parts together and effect a unitary lever member operable for applying and releasing a brake mechanism, a spring urging said locking plate toward said locking engagement, the other end of said locking plate being slotted, a trigger pivotally connected to said other lever part adjacent said lever handle and operably engaging the slotted portion of said locking plate for disengaging the locking arrangement of said lever parts, a link connecting the pawl and said other lever part for disengaging the pawl and sector when said other lever part is rocked on its pivot, a spring member engaging said link for holding the latter in adjusted position, and a U-shaped clip connected to said pawl and arranged with its legs along the side surfaces of said sector to rock the pawl away from the sector as the unitary lever member is swung in a brake applying direction and to rock the pawl into latched engagement with the sector when brake tension is applied to said lever member to move it in an opposite direction.

21. A brake lever construction comprising a support having a portion formed to provide a clutching surface, a lever member pivotally connected to said support, a clutching member pivotally connected to said lever member and arranged to be rocked into and out of engagement with said clutching surface, a clutch release member endwise movable for rocking said clutching member, means for locking said release member in adjusted position, and additional means engaging said clutching member and support to rock the clutching member away from said clutching surface as the lever member is swung in one direction and to rock the clutching member into engagement with the clutching surface when pressure is applied to said lever member to move it in an opposite direction.

22. A brake lever construction comprising a support having an edge shaped to provide a clutching surface, a lever member pivotally connected to said support, a clutching member pivotally carried by said lever member and adapted to be rocked into and out of engagement with said clutching surface, a release member having one end connected to said clutching member and its other end adapted for operation in an endwise direction for rocking said clutching member, a curved spring member engaging said release member to lock the latter in its rocked position, a U-shaped clip connected to said clutching member and frictionally engaging said support to rock the clutching member into and out of clutching engagement when pressure is applied to move said lever member, said rocking direction depending upon the direction of movement of said lever, and a stop on said support limiting the movement of said lever member in one direction.

23. A lever construction comprising a support, levers pivoted to said support to swing, cooperating clutching members for holding said levers in adjusted position, one of said clutching members having separate pivotal connections to each of said levers, and means frictionally connecting one of said levers to said support, said means operatively connecting said clutching members whereby said one clutching member is rocked into and out of engagement with the other of said clutching members when the other of said levers is swung on said support.

24. A lever construction comprising lever members co-pivotally connected to a support to swing, connecting means between said lever members permitting relative swinging movements of the lever members toward and away from each other between predetermined limits, and means between one of said lever members and said support imposing a drag on said one lever member for holding the lever members in spaced relation from each other for unitary swinging movement in one direction and for holding the lever members together in overlapped relation for unitary swinging movement in the opposite direction.

25. A lever construction comprising pivoted lever members in partial telescopic relation, a surface on the telescoped portion of one lever being spaced from an adjacent surface on a portion of the other lever, an endwise movable spring member, an offset portion on one end of said spring, and means on the other end of said spring for moving it in an endwise direction, said offset portion when moved between said lever surfaces maintaining the levers in locked relation for unitary movement and when moved in the opposite direction rendering one of said levers free for movement relative to the other of said levers.

26. Release mechanism for a lever construction comprising a lever pivoted to another member to swing relative thereto, a release member having one end arranged for movement between said lever and said other member for locking said lever against movement relative to said other member and for movement out of said between-engagement for rendering said lever free for movement relative to said other member, an aperture in the other end of said release member, and a trigger pivotally connected at one end to said lever and having an intermediate portion seated within said release member aperture for moving the release member in an endwise direction when said trigger is rocked on its pivotal connection.

27. Release mechanism for a swinging lever construction comprising cooperating clutching members for holding the lever construction in adjusted position, an endwise movable release member connected to one of said clutching members for moving said one clutching member into and out of cooperation with the other of said clutching members, and curved spring means connected to the lever construction and having end portions movable of their own accord into and out of engagement with said release member as the latter is moved in endwise directions, one of said spring ends engaging and holding said release member when the latter has moved said one clutching member into cooperation with the other clutching member and the other of said spring ends engaging and holding said release member when the latter has moved said one clutching member out of cooperation with the other clutching member.

28. Release mechanism for a swinging lever construction comprising cooperating clutching members for holding the lever construction in adjusted position, an endwise movable release member connected to one of said clutching members for moving said one clutching member into and out of cooperation with the other of said clutching members, spaced notches in a side edge of said release member, a curved spring member connected at its central portion to said lever construction, flanges on the ends of said spring member shaped to seat in said notches, said spring ends being fulcrumed on the central connected portion of said spring and movable of their own accord into and out of engagement with said release member, said flanges on the ends of said spring selectively engaging the notches in said release member to hold the latter in adjusted position when moved in endwise directions for actuating said one clutching member.

29. A release mechanism spring for lever constructions comprising a flat metal member curved in a longitudinal direction, locking ears extending laterally from the side edges of said member substantially at its central portion, and radially extending flanges at the ends of said member.

HERBERT S. JANDUS.
HUGH BUCHANAN.